June 28, 1955 M. E. MOORE 2,711,545
AUTOMOBILE SEAT PLATFORM
Filed Oct. 20, 1952

INVENTOR.
MARY E. MOORE.
BY
*Knox & Knox*
AGENTS

United States Patent Office 2,711,545
Patented June 28, 1955

2,711,545

AUTOMOBILE SEAT PLATFORM

Mary E. Moore, San Diego, Calif.

Application October 20, 1952, Serial No. 315,677

5 Claims. (Cl. 5—118)

The present invention relates generally to a folding platform and more particularly to a folding platform particularly adaptable for use in converting an automobile seat into a support for a bed or luggage.

The primary object of this invention is to provide an automobile seat platform having supporting legs and means of adjustment to adapt said platform to an automobile seat, thus providing convenient support means and storage spaces.

Another object of this invention is to provide an automobile seat platform of the type described comprising a plurality of hinged portions enabling the device to be folded into a compact unit.

Another object of this invention is to provide an automobile seat platform of the type described which is easily levelled or inclined as desired and generally ideally adapted for use as a support for a baby's bed during travel in the automobile.

Another object of this invention is to provide an automobile seat platform which may be used to support heavy packages or bulky loads which would cause damage if placed directly on the automobile seat.

Another object of this invention, ancillary to the preceding objects, is to teach the best known mode of implementing the principles of the invention in carrying the invention into actual practice.

Another object of this invention is to provide an automobile seat platform which is adapted for fabrication from many different materials, so that the choice of material can be according to the dictates of availability and price considerations, the exact sizes and proportions being matters easily determined to suit particular conditions and needs.

Another object of this invention is to provide an automobile seat platform which is inexpensive and practicable to manufacture.

Finally, it is an object to provide an automobile seat platform of the aforementioned character which is simple, safe and convenient to use, and which will give generally efficient and durable service.

With these and other objects definitely in view, this invention consists in the novel construction, combination and arrangement of elements and portions, as will be hereinafter fully described in the specification, particularly pointed out in the claims, and illustrated in the drawing which forms a material part of this disclosure and wherein similar characters of reference indicate similar or identical elements and portions throughout the specification and throughout the views of the drawing, and in which:

Figure 1:
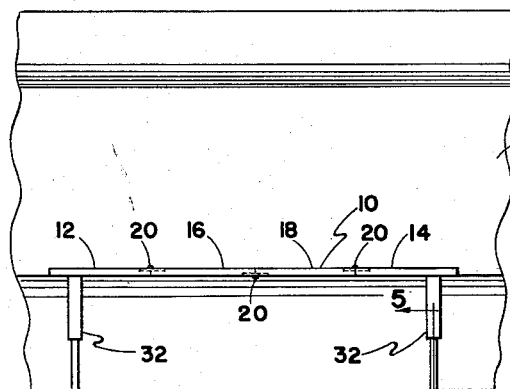
Fig. 1 is a front elevation view of the device in the erected position on an automobile seat.

Referring now to the drawing in detail the device comprises a platform 10 having two outer panels 12 and 14 and two inner panels 16 and 18 all of plywood or other suitable material. The outer panel 12 is attached to the inner panel 16, the outer panel 14 is attached to the inner panel 18 and the inner panel 16 is attached to the inner panel 18 all by means of hinges 20 which are secured by screws 22. The hinges connecting the two inner panels are on the opposite surface to the hinges connecting the outer panels to the inner panels so that the platform may be folded in an accordion-like manner.

Figure 2:
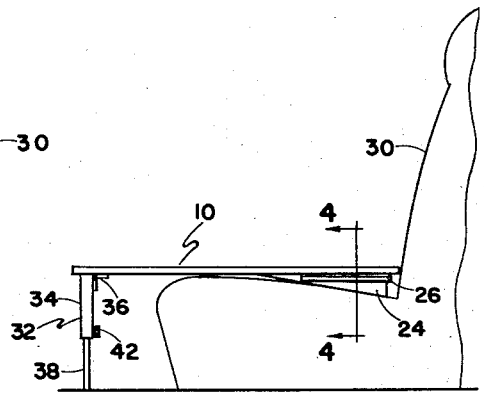
Fig. 2 is a side elevation view of the device in the erected position.
Figure 3:
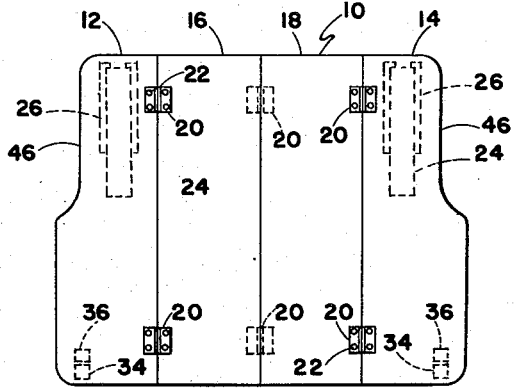
Fig. 3 is a plan view of the device.
Figure 4:
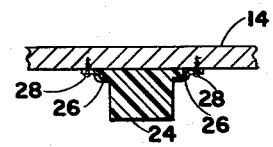
Fig. 4 is an enlarged sectional view taken on the line 4—4 of Fig. 2.
Figure 5:
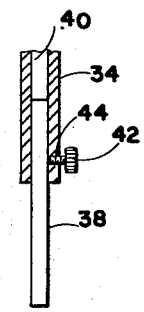
Fig. 5 is an enlarged sectional view taken on the line 5—5 of Fig. 1.

The outer panels 12 and 14 are each provided with a wedge 24 longitudinally, slidably mounted between rail members 26 which are secured to the lower surface of the said outer panels by means of screws 28 in such a manner that the wedges 24 may be adjusted to fit the slope of the automobile seat 30 as illustrated in Fig. 2.

The forward end of the platform 10 is supported by two adjustable legs 32 extending to the floor of the automobile, each comprising a tubular portion 34 attached to the lower surfaces of the outer panels 12 and 14 by means of a hinge 36 so that said adjustable legs may be folded parallel to said outer panels. Each adjustable leg 32 includes a rod 38 slidably fitted within the bore 40 of the tubular portion 34, this rod being retained in any desired position by means of a thumbscrew 42 threadedly engaged with a screw threaded hole 44 in said tubular portion.

The outer panels are relieved as at 46, opposite said wedges 24 to accommodate arm rests conventionally provided on the back seats of automobiles. The folding platform is substantially coextensive with the area of the back seat in addition to the space between the back seat and the back of the front seat, and the platform also extends to the sides or back doors of the car. Therefore, there is not sufficient space at any edge of the platform to allow a child to fall from the platform or to become wedged between the platform and an adjoining part of the car. To accomplish this feature several sizes of platforms could be made to fit various makes and models of automobiles.

Figure 6:
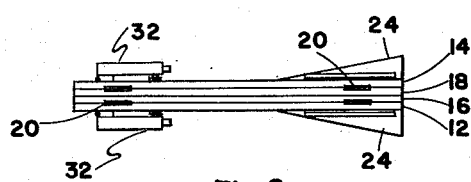
Fig. 6 is a side elevation view of the device in the folded position.

The device may be folded into a compact unit as illustrated in Fig. 6 requiring but little storage space when not in use.

It will be obvious that the seat platform may be used for many purposes, one such purpose being the provision of a firm flat surface of sufficient area to support a baby's bed, or mattress-like cushioning material for a young child, during extended journeys in an automobile. A further example of the utility of the device is the provision of a support for large or heavy luggage, sample cases or packages which would damage the upholstery if placed directly on the seat.

The operation of this invention will be clearly comprehended from a consideration of the foregoing description of the mechanical details thereof, taken in connection with the drawing and the above recited objects. It will be obvious that all said objects are amply achieved by this invention.

Further description would appear to be unnecessary.

It is understood that minor variation from the form of the invention disclosed herein may be made without departure from the spirit and scope of the invention, and that the specification and drawing are to be considered as merely illustrative rather than limiting.

I claim:

1. An assembly for converting an automobile seat into a platform, comprising a plurality of elongated parallel panels having their contiguous edges hinged together, legs on corresponding ends of certain of said panels, and automobile seat-engaging wedges on certain of said panels and disposed on the same side thereof as said legs, said wedges increasing to vertically greater dimension at the edges thereof remote from said legs, said wedges being adjustable longitudinally of the corresponding panels.

2. An assembly according to claim 1 and wherein said legs are adjustable as to length and hinged for folding toward said wedges and into parallel relation with said panels.

3. An assembly for converting an automobile seat into a platform, comprising a plurality of elongated parallel panels having their contiguous edges hinged together, telescopic legs on corresponding ends of certain of said panels, and automobile seat-engaging wedges on certain of said panels and disposed on the same side thereof as said legs, said wedges increasing to vertically greater dimension at the edges thereof remote from said legs, said wedges being adjustable longitudinally of said panels, said legs being pivotally mounted to enable folding of the legs into parallel relation with the panels, said telescopic legs and said wedges being relatively adjustable and together constituting means for levelling the platform.

4. An assembly for converting an automobile seat into a platform, comprising a plurality of elongated parallel panels having their contiguous edges hinged together, legs on corresponding ends of certain of said panels, and automobile seat-engaging wedges on certain of said panels and disposed on the same side thereof as said legs, said wedges increasing to vertically greater dimension at the edges thereof remote from said legs, said wedges being adjustable longitudinally of said panels, said legs being pivotally mounted to enable folding of the legs into parallel relation with the panels, said panels including a pair of hinged inner panels and a pair of outer panels hinged on the outer longitudinal edges of said inner panels, said panels being foldable in accordion-like manner.

5. An assembly for converting an automobile seat into a platform, comprising a plurality of elongated parallel panels having their contiguous edges hinged together, legs on corresponding ends of certain of said panels, and automobile seat-engaging wedges on certain of said panels and disposed on the same side thereof as said legs, said wedges increasing to vertically greater dimension at the edges thereof remote from said legs, said wedges being adjustable longitudinally of said panels, said legs being pivotally mounted to enable folding of the legs into parallel relation with the panels, said panels including a pair of hinged inner panels and a pair of outer panels hinged on the outer longitudinal edges of said inner panels, said panels being foldable in accordion-like manner, the outer panels being relieved at their outer edges opposite to said wedges to fit within arm rests in the back seat of an automobile, said panels being dimensioned to cover said back seat and to occupy an area between the front and back seats of an automobile wherewith the device is used.

References Cited in the file of this patent

UNITED STATES PATENTS

| 1,208,053 | Van Allen | Dec. 12, 1916 |
| 1,238,480 | Austin | Aug. 28, 1917 |
| 1,333,924 | Kay | Mar. 16, 1920 |
| 2,583,187 | St. Clair Newborn | Jan. 22, 1952 |

OTHER REFERENCES

Popular Mechanics, article by Bethurum, page 189, September 1951.